United States Patent [19]
Sommer

[11] Patent Number: 5,544,912
[45] Date of Patent: Aug. 13, 1996

[54] SUPPLEMENTAL INFLATION RESTRAINT AND DOOR ARRANGEMENT

[75] Inventor: James J. Sommer, Tipp City, Ohio

[73] Assignee: General Motors Corporation, Detroit, Mich.

[21] Appl. No.: 359,304

[22] Filed: Dec. 19, 1994

[51] Int. Cl.$^6$ .................................................. B60R 21/16
[52] U.S. Cl. ........................................ 280/728.3; 280/752
[58] Field of Search ............................. 280/728.1, 728.3, 280/732, 752

[56] References Cited

U.S. PATENT DOCUMENTS

| 5,056,814 | 10/1991 | Shiraki et al. | 280/731 |
| 5,064,217 | 11/1991 | Shiraki | 280/743 |
| 5,080,393 | 1/1992 | Dixon, Jr. et al. | 280/732 |
| 5,118,132 | 6/1992 | Nakajima | 280/728 |
| 5,121,942 | 6/1992 | Warnick et al. | 280/732 |
| 5,152,548 | 10/1992 | Zushi | 280/728 |
| 5,203,586 | 4/1993 | Niwa et al. | 280/728 |
| 5,238,264 | 8/1993 | Barnes | 280/732 |
| 5,316,335 | 5/1994 | Gray et al. | 280/728.3 |
| 5,335,937 | 8/1994 | Uphues et al. | 280/728 B |
| 5,335,939 | 8/1994 | Kuriyama et al. | 280/728 B |
| 5,372,379 | 12/1994 | Parker | 280/732 |
| 5,390,950 | 2/1995 | Barnes et al. | 280/728 B |
| 5,433,474 | 7/1995 | Farrington et al. | 280/732 |

OTHER PUBLICATIONS

Disclosure No. 34575, "Cover Reaction Ring for an Integral PSIR Door," Research Disclosure, p. 50. Jan. 1993.

Primary Examiner—Karin L. Tyson
Attorney, Agent, or Firm—Ernest E. Helms

[57] ABSTRACT

A passenger-side supplemental inflation restraint and door arrangement is provided including an air bag housing mounted in a forward portion of the vehicle, an inflator positioned within the housing, an air bag and an instrument panel covering the air bag. The instrument panel includes a rigid self-supporting polymeric base having a preform defining a door and a door opening, a generally non-supporting polymeric skin covering the base and spaced therefrom, a molded polymeric foam with a density lower than that of the base and the skin supporting the skin on the base, and a self-supporting foam border material joined to the base on the door opening portion on a side of the base adjacent the polymeric skin generally adjacent to the preform along the door opening and the self-supporting foam border material extending toward the skin.

6 Claims, 2 Drawing Sheets

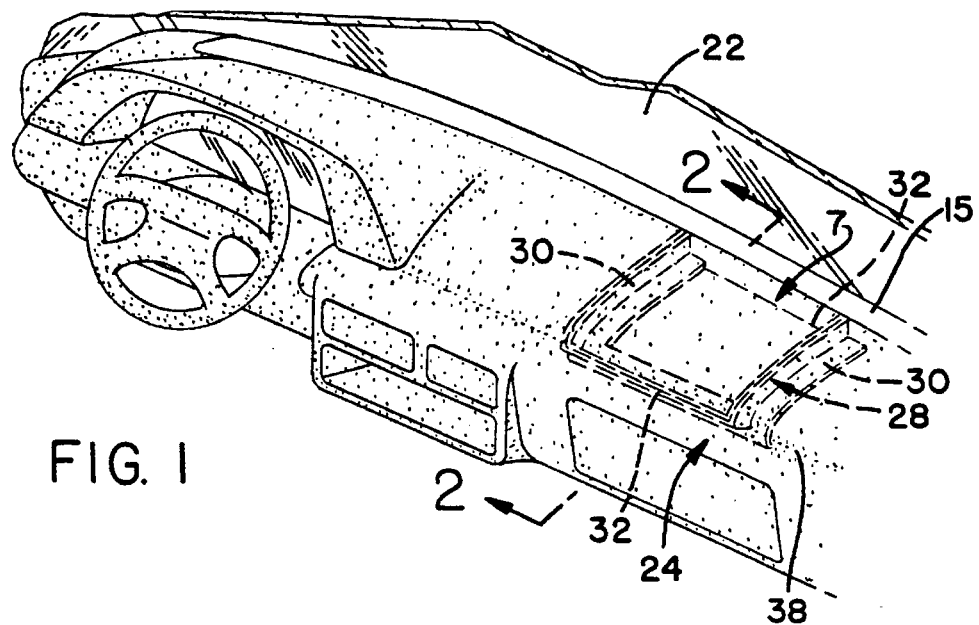
FIG. 1
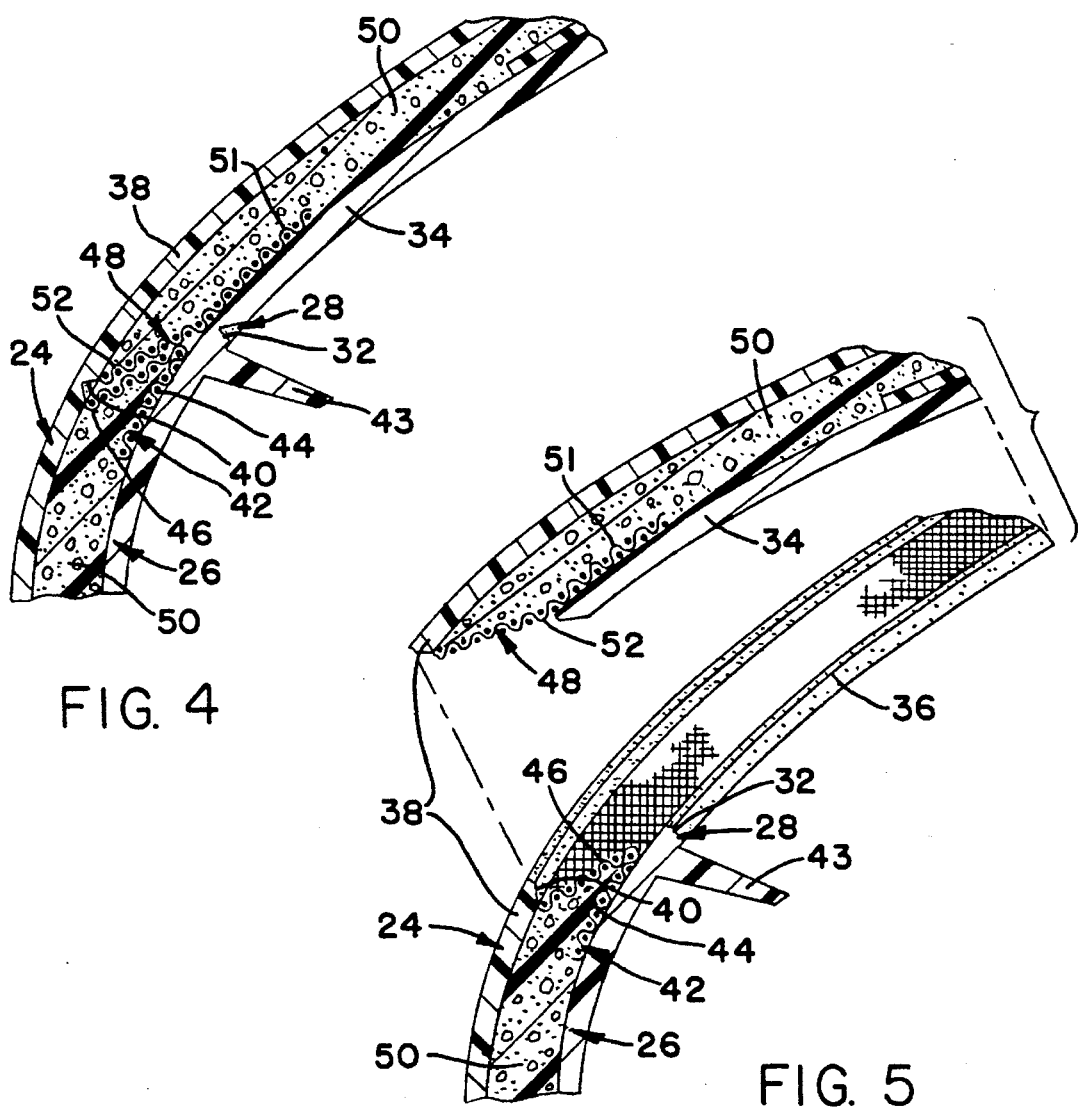
FIG. 4
FIG. 5

SUPPLEMENTAL INFLATION RESTRAINT AND DOOR ARRANGEMENT

FIELD OF THE INVENTION

The field of the present invention is that of passenger side supplemental inflation restraints (SIR), often referred to as air bags. More particularly, the present invention relates to passenger side air bags and an arrangement thereof in conjunction with the instrument panel of an automotive vehicle.

BACKGROUND OF THE INVENTION

More automotive manufacturers are typically placing passenger side air bags in a position to deploy closer to a windshield of a vehicle to utilize the vehicle windshield as a reaction surface.. When placing an air bag assembly adjacent to the vehicle front windshield underneath the instrument panel (sometimes referred to as the dashboard), there is typically provided therein a separate air bag door. Air bag doors often provide an appearance problem of fit and finish with the remainder of the instrument panel and also can be aesthetically unpleasing if the vinyl in its grain pattern on the door does not match the grain pattern on the remainder of the instrument panel. It would be highly desirable to provide a passenger side air bag door which can be positioned in an area adjacent the windshield of the vehicle and whose appearance is almost completely hidden.

SUMMARY OF THE INVENTION

The present invention provides an air bag and an air bag door arrangement wherein the air bag door is almost totally invisible from view of a passenger seated within the vehicle. Additionally, the special construction of the opening and door in a preferred embodiment greatly diminishes any possible foam fragmentation which may be experienced.

BRIEF DESCRIPTION OF THE DRAWINGS

FIG. 1 is a perspective view of a preferred embodiment single hinge passenger side SIR and door arrangement of the present invention.

FIG. 4 is an enlargement of a portion of FIG. 2.

FIG. 5 is a view similar to that of FIG. 3 that is enlarged and shows details of the door and surrounding opening during an earlier stage of air bag operation.

DESCRIPTION OF THE PREFERRED EMBODIMENT

Figure 2:
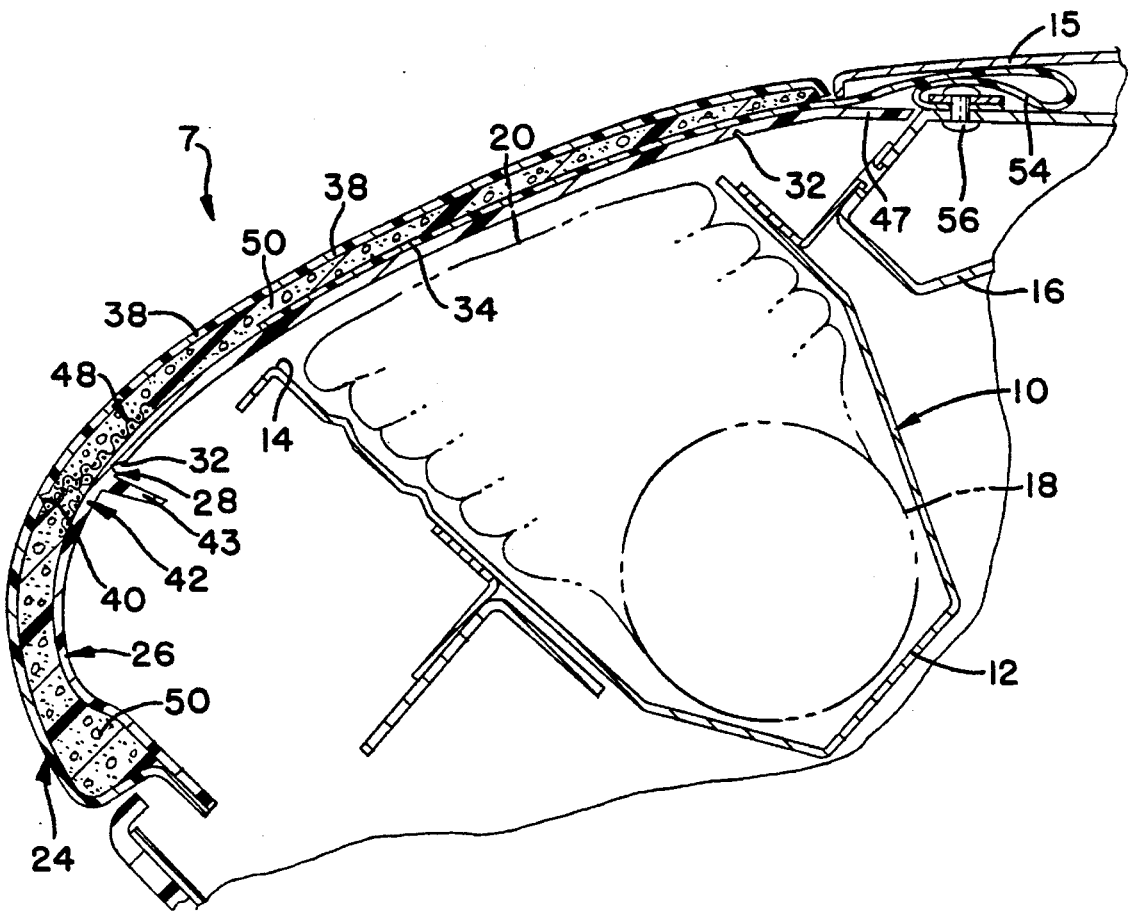
FIG. 2 is an enlargement of a view taken along line 2—2 of FIG. 1.
Figure 3:
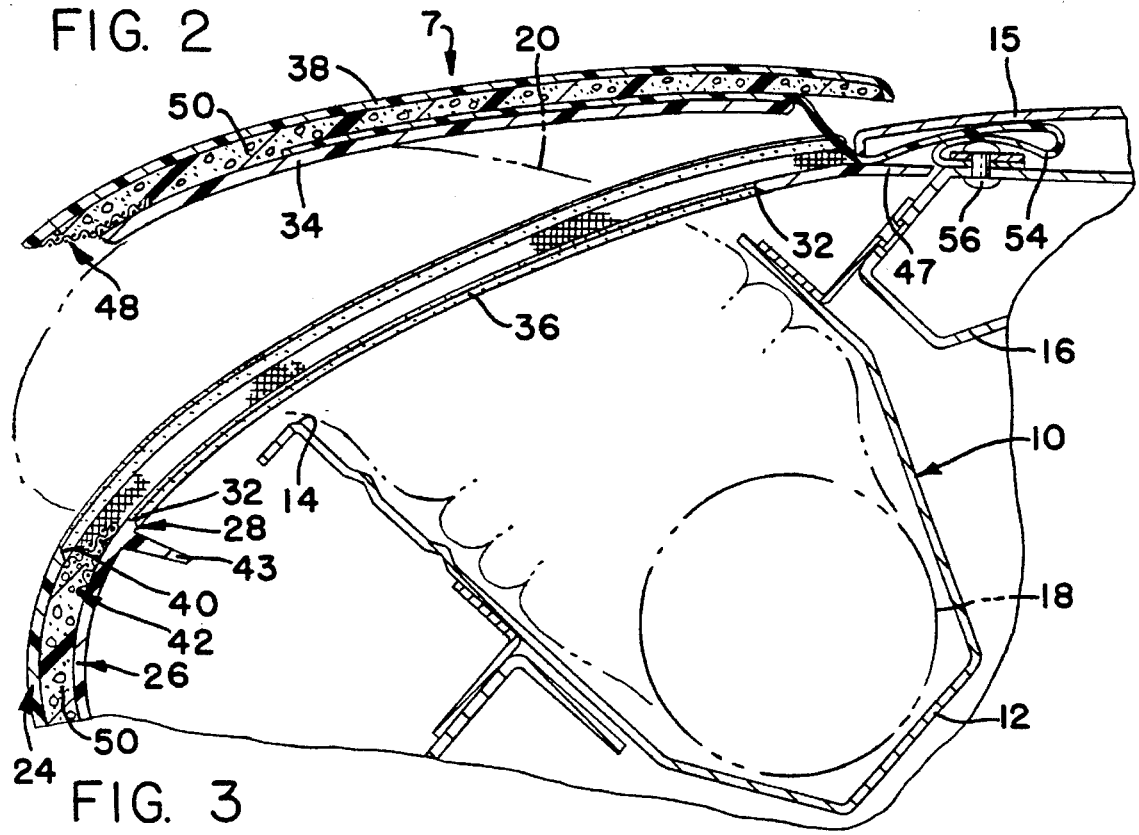
FIG. 3 is a view similar to that of FIG. 2 showing operation of the door after air bag inflation.

Referring to FIGS. 1–5, the SIR and door arrangement 7 of the present invention has an air bag housing 10 mounted in a forward portion of the vehicle, in most instances in close proximity to a windshield 22. The air bag housing 10 has a closed end 12 and an open end 14 and is typically connected to a sheet metal portion of the vehicle 16 underneath a ledge 15. Positioned within the air bag housing 10 is an air bag inflator (shown in phantom) 18. The air bag inflator provides a source of rapid fluid inflation for an air bag 20. Covering the air bag 20 and air bag housing 10 is an instrument panel 24. The instrument panel 24 typically has a generally rigid self-supporting polymeric base 26. The base 26 is typically made from a moldable acrylonitrile-butadienestyrene (ABS), styrenic maleic acid (SMA) or polycarbonate plastic. The base 26 has a groove preform 28 having two sides 30 and top and bottom 32 to define a door 34 and a door opening 36.

Covering the instrument panel base 26 and spaced therefrom is a generally non-self-supporting polymeric polyvinyl chloride plastic skin 38. The skin 38 is typically preformed by a vacuum molding process. The skin is typically in the range of 1.0 mm thick.

The skin 38 on a side facing the base 26 will have a preform notch 40 (best shown in FIG. 4) which generally follows the pattern defined by preform notch 28 of the base.

Joined by adhesive or other mechanism means to the side of the base 26 which faces the skin 38 is a self-supporting foam border material 42 having a leg 44 joined to the base material and a bent-over second leg 46 which extends toward the skin 38 to an area closely adjacent to notch 40. The foam border material will typically be a mesh material having squares of 2.0 mm and be fabricated from an aluminum material. A typical adhesive to hold the first leg 44 to the base material 26 is structural methacrylate.

The first foam border material 42 generally defines the edge of the door opening. A second foam border material 48 is of a similar material as that of the first foam border material 42 and has a first leg 51 mechanically or adhesively bound to the base 26 with a second leg 52 which overlies the bent-over second leg 46 of the first foam border material 42.

Supporting the skin 38 on the base 26 is a moldable polymeric foam 50 such as polyurethane typically having a density of 4 lbm/ft$^3$, which is lower than the density of the skin 38 or the base 26.

To fabricate the instrument panel, typically the base 26 and skin 38 will be placed in a mold and the foam 50 will be shot therein. The foam border materials 42 and 48 will define therebetween a border section for the foam 50. Additionally, joined toward the top end of the door 34 will be a hinge tether 54 having one end joined to the door 34 and a second end which lies over a top portion 47 of the door opening and is attached to the car body by rivets 56.

In operation, inflation of the air bag 20 by the inflator 18 will cause the air bag 20 to push against the door 34, causing it to break away along preforms 40 and 28. Tether 54 will prevent the door 34 from flying outwardly. Although the sides of the air bag 20 will scrape against the sides 36 of the door opening, very little if any foam 50 will become fragmented due to the foam border material 42. In like manner, foam border material 48 will prevent any fragmentation of the foam 50 coming from the door 34.

A reinforcement rib 43 keeps the opening portion of the base 26 along the bottom 32 and the sides 30 from breaking apart during deployment of air bag 20.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A single hinge passenger side supplemental inflation restraint and door arrangement comprising:

an air bag housing having closed and opened ends, the housing being mounted in a forward portion of the vehicle;

an air bag inflator positioned within the housing for providing a source of rapid fluid inflation;

an air bag for receipt of fluid inflation from the inflator; and an instrument panel normally covering the air bag and air bag housing, the instrument panel including:
- a generally rigid self-supporting polymeric base, the base having a preform defining a door portion and a door opening portion;
- a generally non-supporting polymeric skin covering the base and spaced therefrom;
- a molded polymeric foam with a density lower than that of the base and the skin supporting the skin on the base; and
- a self-supporting foam border material joined to the base on the door opening portion on a side of the base adjacent the polymeric skin generally adjacent to the preform along the door opening and the self-supporting foam border material extending toward the skin.

2. A passenger side supplemental inflation restraint and door arrangement as described in claim 1 wherein the self-supporting border material is a mesh.

3. A passenger side supplemental inflation restraint and door arrangement as described in claim 1 wherein the foam border material is bent back upon itself.

4. A passenger side supplemental inflation restraint and door arrangement as described in claim 1 wherein the skin has a notch on a side of the skin facing the base.

5. A passenger side supplemental inflation restraint and door arrangement as described in claim 1 wherein the door portion of the base has attached thereto a second foam border material which extends to the skin generally adjacent to the foam border material joined to the border portion of the base.

6. A single hinge passenger side supplemental inflation restraint and door arrangement comprising:

an air bag housing having closed and opened ends, the housing being mounted in a forward portion of the vehicle;

an air bag inflator positioned within the housing for providing a source of rapid fluid inflation;

an air bag for receipt of fluid inflation from the inflator; and an instrument panel normally covering the air bag and air bag housing open end, the instrument panel including:
- a generally rigid self-supporting polymeric base, the base having a preform defining a door portion and a door opening portion;
- a generally non-supporting polymeric skin covering the base and spaced therefrom;
- a molded polymeric foam with a density lower than that of the base and the skin supporting the skin on the base;
- a first self-supporting foam mesh border material joined to the base on the door opening portion generally adjacent to the preform and extending toward the skin backing upon itself extending to the skin; and
- a second generally self-supporting foam border material joined to the base on the door portion extending to the skin adjacent to the first self-supporting border material.

* * * * *